United States Patent
Riddiford

(10) Patent No.: US 10,442,267 B2
(45) Date of Patent: Oct. 15, 2019

(54) VEHICLE SUSPENSION CONTROL SYSTEM AND METHOD FOR ELIMINATING MANIFOLD EXHAUST NOISE ON COMPRESSOR START

(71) Applicant: BeijingWest Industries Co., Ltd., Beijing (CN)

(72) Inventor: Bryan Peter Riddiford, Dayton, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 27 days.

(21) Appl. No.: 15/713,533

(22) Filed: Sep. 22, 2017

(65) Prior Publication Data

US 2018/0111437 A1    Apr. 26, 2018

Related U.S. Application Data

(60) Provisional application No. 62/411,709, filed on Oct. 24, 2016.

(51) Int. Cl.
*B60G 17/015*    (2006.01)
*B60G 17/052*    (2006.01)
*B60G 11/27*    (2006.01)

(52) U.S. Cl.
CPC ............ *B60G 17/015* (2013.01); *B60G 11/27* (2013.01); *B60G 17/0523* (2013.01);
(Continued)

(58) Field of Classification Search
CPC .. B60G 17/015; B60G 11/27; B60G 17/0523; B60G 2500/204; B60G 2500/2042; B60G 2500/205

See application file for complete search history.

(56) References Cited

U.S. PATENT DOCUMENTS 4,824,186 A * 4/1989 Leiber ..................... B60T 8/26
                                                    180/197
5,288,102 A * 2/1994 Machida ............... B60G 15/12
                                                    267/64.16
(Continued)

FOREIGN PATENT DOCUMENTS

CN    102658768 A    9/2012
CN    104080631 A    10/2014
(Continued)

OTHER PUBLICATIONS

European Search Report dated Mar. 27, 2018, for counterpart European Patent Application No. 17001750.3, 12 pages.
(Continued)

*Primary Examiner* — Drew J Brown
(74) *Attorney, Agent, or Firm* — William H. Honaker; Dickinson Wright PLLC

(57) ABSTRACT

An air management system and method are provided. The system includes a compressor and a reservoir tank coupled to the compressor. A manifold block has a plurality of valves and is coupled to the reservoir tank and the compressor for controlling air flow. At least one pressure sensor is coupled to the manifold block. The compressor includes a boost valve for selectively directly connecting the reservoir tank and an air inlet of the compressor. An electronic control unit is coupled to the valves, compressor, and the at least one pressure sensor and is configured to provide pressurized air from the reservoir tank to the air inlet, determine a pressure difference between the manifold block and the boost valve, and retain pressure in the manifold block in response to the pressure difference being less than a predetermined amount to reduce startup torque of the compressor without exhausting the manifold block.

19 Claims, 3 Drawing Sheets

Figure 1:
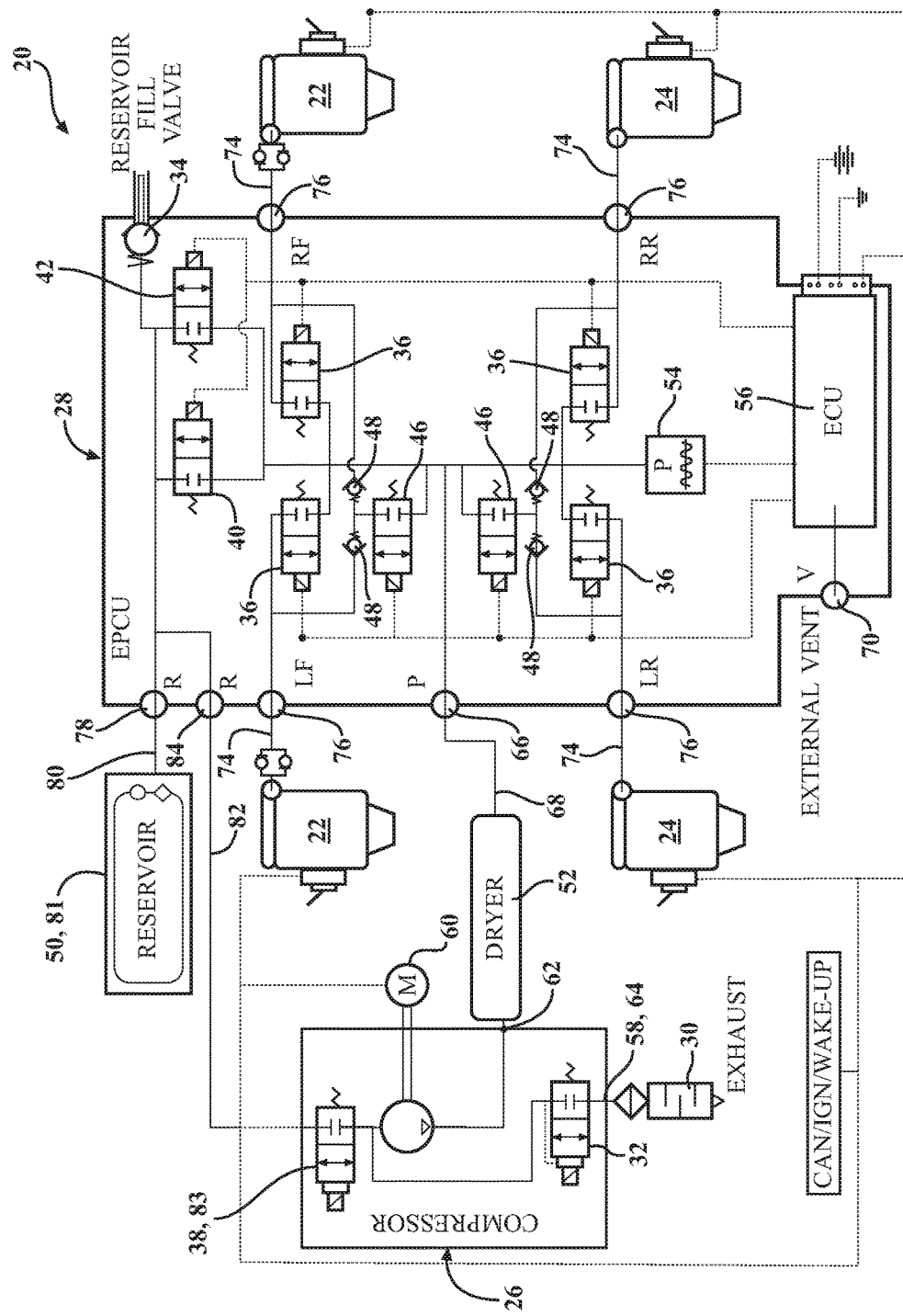

(52) U.S. Cl.
CPC .. *B60G 2500/204* (2013.01); *B60G 2500/205* (2013.01); *B60G 2500/2042* (2013.01)

(56) References Cited

U.S. PATENT DOCUMENTS

| | | | | |
|---|---|---|---|---|
| 5,466,007 | A * | 11/1995 | Smith | B60G 17/0155 280/124.102 |
| 8,814,190 | B2 * | 8/2014 | Becher | F04B 7/02 280/124.16 |
| 2010/0287922 | A1 * | 11/2010 | Rosman | B60K 6/12 60/327 |
| 2012/0112523 | A1 * | 5/2012 | Stoehr | B60T 13/263 303/2 |
| 2013/0255240 | A1 | 10/2013 | Bergemann et al. | |
| 2013/0257007 | A1 * | 10/2013 | Frank | B60G 17/0523 280/124.161 |
| 2013/0318954 | A1 * | 12/2013 | Frank | B60G 17/0155 60/407 |
| 2014/0312590 | A1 * | 10/2014 | Stabenow | B60G 17/0525 280/124.16 |
| 2015/0151602 | A1 * | 6/2015 | Suzuki | B60G 17/017 280/6.157 |
| 2015/0151603 | A1 * | 6/2015 | Kondo | B60G 17/017 280/6.157 |
| 2015/0345490 | A1 | 12/2015 | Bremeier et al. | |
| 2017/0267046 | A1 * | 9/2017 | Reuter | B60G 11/30 |
| 2018/0222275 | A1 * | 8/2018 | Reuter | B60G 17/0523 |
| 2018/0319236 | A1 * | 11/2018 | Riddiford | B60G 17/0155 |

FOREIGN PATENT DOCUMENTS

| | | | |
|---|---|---|---|
| CN | 104669976 | A | 6/2015 |
| CN | 104684745 | A | 6/2015 |
| CN | 103906635 | A | 7/2017 |
| DE | 102014012646 | A1 | 2/2016 |
| EP | 2878464 | A2 | 6/2015 |
| EP | 3219522 | A1 | 9/2017 |
| JP | 01218911 | A * | 9/1989 ........... B60G 17/052 |

OTHER PUBLICATIONS

First Office Action dated Mar. 19, 2019 for counterpart European patent application No. 17001750.3.

First Office Action and search report dated Mar. 18, 2019 for counterpart Chinese patent application No. 201710957941.8, along with EN translation.

* cited by examiner

VEHICLE SUSPENSION CONTROL SYSTEM AND METHOD FOR ELIMINATING MANIFOLD EXHAUST NOISE ON COMPRESSOR START

CROSS-REFERENCE TO RELATED APPLICATIONS

This utility application claims the benefit of U.S. Provisional Application No. 62/411,709 filed Oct. 24, 2016. The entire disclosure of the above application is incorporated herein by reference.

FIELD

An air management system for controlling an air suspension assembly of an automotive vehicle. More specifically, an air suspension control system including a manifold and a compressor and a method for eliminating manifold exhaust noise when the compressor starts.

BACKGROUND

Air suspension assemblies are known in the art for use on automotive vehicles. Such air suspension assemblies typically include a plurality of air springs, each for interconnecting the body and one of the wheels of the automotive vehicle for damping relative forces between the body and the wheels, and for adjusting the height of the automotive vehicle.

In order to control such air suspension assemblies, air management systems are commonly utilized. The air springs are commonly connected via one or more air lines to a manifold of the air management system. The air management system may also include a compressor or pump including a motor may be coupled to the manifold to provide air to fill the air springs. However, if the manifold remains pressurized at the time the compressor is started, the compressor motor requires increased torque, which can lead to stalling the motor. If the motor is stalled, undesirable effects may follow such as a blown fuse for the motor, for example.

Consequently, it is common to exhaust the manifold to under a set pressure (e.g., 3 bar) prior to starting the compressor. As a result, a noticeable noise is produced when exhausting the manifold, due to the rushing air from the manifold. Thus, there remains a need for improvements to such air management systems and methods of operating the air management systems to eliminate the exhaust noise while preventing the compressor motor from stalling.

SUMMARY

An air management system for controlling an air suspension assembly of an automotive vehicle is provided. The air management system includes a compressor for providing pressurized air. A reservoir tank is coupled to the compressor for containing a volume of the pressurized air. A manifold block has a plurality of valves coupled with the air suspension assembly and is coupled to the reservoir tank and the compressor for controlling air flow to the air suspension assembly. At least one pressure sensor is coupled to the manifold block for determining the pressure in the air management system. A boost valve is coupled to the reservoir tank for selectively directly connecting the reservoir tank and an inlet of the compressor. An electronic control unit is coupled to the plurality of valves and the compressor and the at least one pressure sensor and configured to provide the pressurized air from the reservoir tank to the inlet of the compressor using the boost valve, determine a pressure difference between the manifold block and the boost valve, and retain pressure in the manifold block in response to the pressure difference being less than a predetermined amount to provide for a reduction in startup torque of the compressor without exhausting the manifold block.

A method of operating an air management system including a compressor and a manifold block coupled to an air suspension assembly and the compressor for reducing a startup torque of the compressor is also provided. The method includes the steps of pressurizing air in a reservoir tank and providing the pressurized air from the reservoir tank to an air inlet of a compressor. The method continues by determining a pressure difference between a manifold block and the inlet of the compressor. Next, retaining pressure in the manifold block in response to the pressure difference being less than a predetermined amount. The method concludes by starting a motor of the compressor.

The invention in its broadest aspect therefore eliminates or at least reduces the occurrence of a noise associated with exhausting the manifold block, while reducing the startup torque of the compressor. The reduction of startup torque helps prevent the motor of the compressor from stalling.

DRAWINGS

Figure 2:
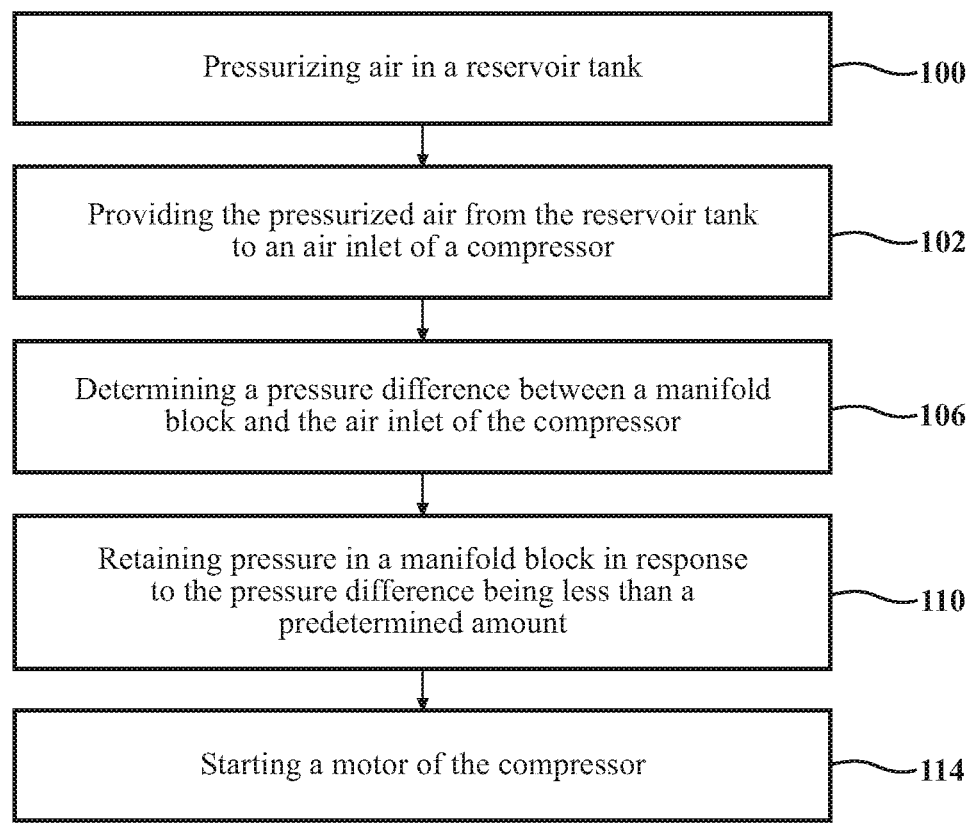
Figure 3:
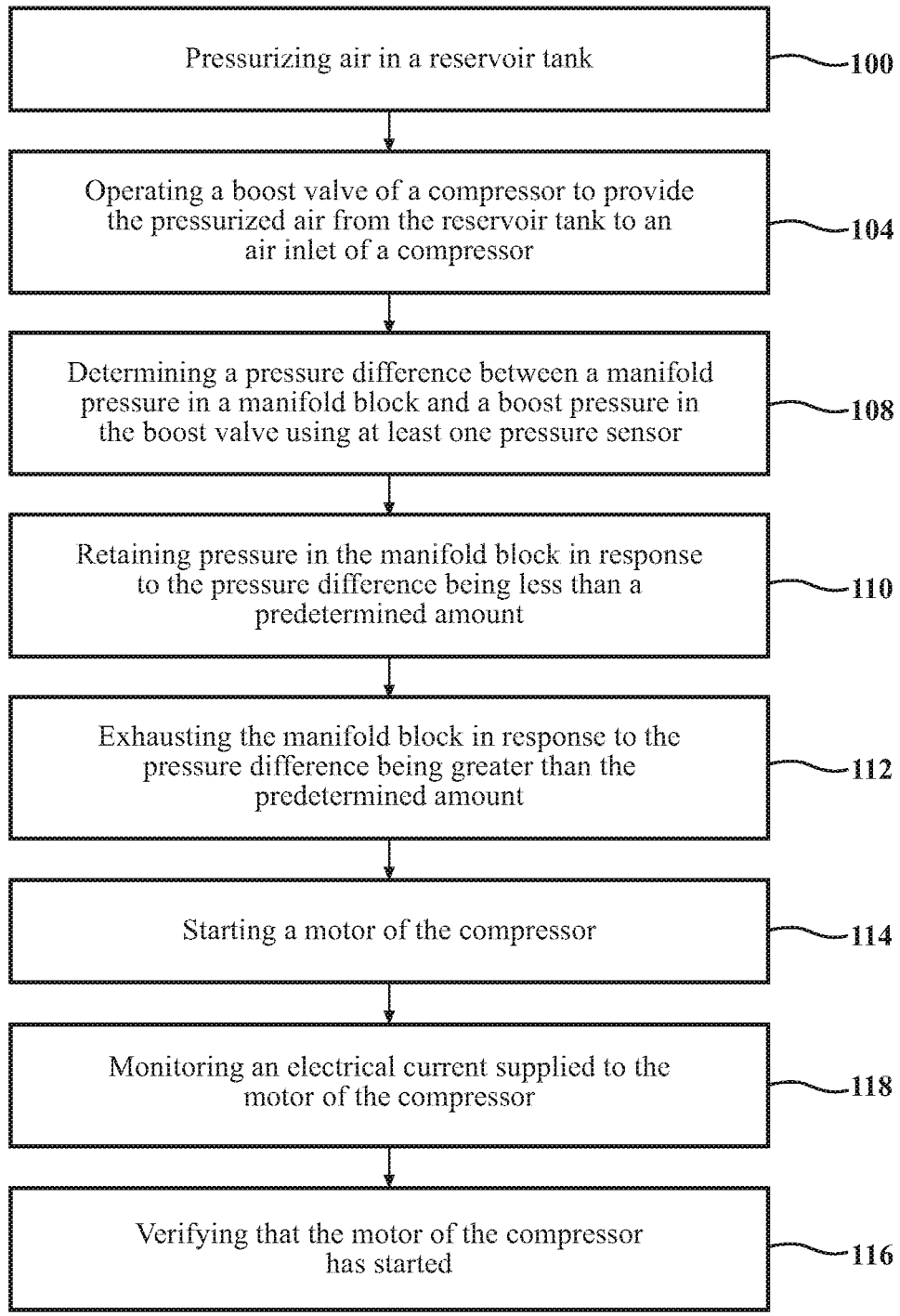

Advantages of the present invention will be readily appreciated, as the same becomes better understood by reference to the following detailed description when considered in connection with the accompanying drawings wherein:

FIG. 1 is a schematic diagram of an air management system according to aspects of the disclosure; and FIGS. 2 and 3 are flow charts illustrating steps of methods of operating the air management system according to aspects of the disclosure.

DETAILED DESCRIPTION

Referring to the Figures, an air management system 20 is generally shown for controlling an air suspension assembly of an automotive vehicle having a body and four wheels. Additionally, a method of operating the air management system 20 is also disclosed.

As best presented in FIG. 1, the air management system 20 connects to a pair of front air springs 22 that interconnect the body and the front wheels of the vehicle, and a pair of rear air springs 24 that interconnect the body and the rear wheels of the vehicle. The air springs 22, 24 dampen relative forces between the body and wheels, and raise and lower the automotive vehicle to a desired height.

The air management system 20 includes a generally indicated compressor 26 connected to the air springs 22, 24 for providing pressurized air for filling the air springs 22, 24, a manifold block 28 having a plurality of valves 34, 36, 40, 42, 46, 48 for controlling which air springs 22, 24 are filled and emptied, a reservoir tank 50 for containing a pressurized volume of air, a dryer 52 for reducing the moisture content of the air in the air management system 20, at least one pressure sensor 54, 81, 83 for determining the pressure in the air springs 22, 24, and an electronic control unit 56 disposed in or coupled with the manifold block 28 for monitoring the at least one pressure sensor 54, 81, 83 and controlling the air management system 20 to operate the compressor 26, valves 32, 34, 36, 38, 40, 42, 46, 48, and fill or empty the air springs 22, 24. The height varying capabilities of the air management system 20 can be used to perform such functions as maintaining the vehicle ride height due to load variation, lowering the vehicle at speed to provide for improved fuel economy, lowering the vehicle to provide for ease in entering and exiting the vehicle, and for adjusting the height of respective sides of the vehicle for compensating for side-to-side load variations of the vehicle.

The compressor 26 defines an air inlet 58 for receiving air into the compressor 26, as well as a motor 60 for drawing air through the air inlet 58. The compressor 26 also defines a primary outlet 62 for fluidly connecting the compressor 26 with, and providing air to the reservoir tank 50 and air springs 22, 24. Furthermore, the compressor 26 defines a first exhaust outlet 64 for relieving air from the air management system 20. An exhaust silencer 30 connects to the first exhaust outlet 64. The compressor 26 also includes an exhaust valve 32 that is electrically connected to the electronic control unit 56 for selectively opening and closing the exhaust valve 32 for inhibiting and allowing air to pass through the first exhaust outlet 64.

The manifold block 28 fluidly connects the air springs 22, 24, compressor 26, dryer 52, and reservoir tank 50. The manifold block 28 defines a compressor inlet port 66. A base pneumatic line 68 extends between the compressor 26 primary outlet 62 and the compressor inlet port 66 of the manifold block 28 for conveying air between the manifold block 28 and the compressor 26. The manifold block 28 additionally defines an external vent 70 to vent the electronic control unit 56. A reservoir fill valve 34 is also disposed in the manifold block 28 for filling the reservoir tank 50.

The manifold block 28 further defines four suspension ports 76 that are each fluidly connected to the compressor inlet port 66 inside the manifold block 28. A plurality of suspension pneumatic lines 74 each extend between one of the suspension ports 76 and one of the air springs 22, 24 for conveying air between the manifold block 28 and air springs 22, 24. The manifold block 28 further includes a plurality of suspension valves 36, each in line with one of the suspension ports 76 inside the manifold block 28 for inhibiting and allowing air to be conveyed between the manifold block 28 and the respective air springs 22, 24. The suspension valves 36 are each electrically connected with the electronic control unit 56 for selectively opening and closing the suspension valves 36.

The reservoir tank 50 stores compressed air from the compressor 26 for being distributed to the air springs 22, 24. Because of the stored energy of the compressed air in the reservoir tank 50, the air management system 20 is able to adjust the height of each wheel independently and can elevate the vehicle much quicker due than it would be able to without the reservoir tank 50. The manifold block 28 defines a reservoir port 78 that is fluidly connected to the suspension ports 76 and compressor inlet port 66. A reservoir pneumatic line 80 extends from the reservoir port 78 to the reservoir tank 50 for conveying air between the manifold block 28 and the reservoir tank 50. The pressure sensors 54, 81, 83 can include a reservoir pressure sensor 81 that is disposed in the reservoir tank 50 for determining a pressure in the reservoir tank 50.

The compressor 26 includes a boost valve 38 and a boost line 82 extends between the manifold block 28 and boost valve 38 for selectively directly connecting the manifold block 28 (which is connected to the reservoir tank 50) and air inlet 58 of the compressor 26. In more detail, the boost valve 38 or compressor boost air inlet is isolated from the air inlet 58 and first exhaust outlet 64 when the boost valve 38 is open, in such a manner to reduce to a tolerable level or eliminate air loss through the first exhaust outlet 64 (i.e., exhaust circuit). The pressure sensors 54, 81, 83 used in the air management system 20 can additionally include a boost valve pressure sensor 83 disposed at the boost valve 38 for determining a pressure at the boost valve 38. A boost port 84 is defined by the manifold block 28 for connecting the boost line 82 to the manifold block 28. The boost valve 38 is electrically connected to the electronic control unit 56 for selectively opening and closing the boost valve 38. Such a boost valve 38 is included in compressors 26 such as, but not limited to the Wabco® TWIN compressor 26 with the boost function. It should be understood that other compressors 26 with a similar prime port or boost channel could alternatively be utilized or the boost valve 38 could even be located remotely from the compressor 26 (e.g., disposed in the manifold block 28).

The manifold block 28 further includes a first reservoir valve 40 and a second reservoir valve 42 that are each disposed in line with the reservoir port 78 inside the manifold block 28 for selectively inhibiting and allowing air to be conveyed between the manifold block 28 and reservoir tank 50. The first and second reservoir valves 40, 42 are each electrically connected with the electronic control unit 56 for selectively opening and closing the reservoir valves 40, 42. The first and second reservoir valves 40, 42 are positioned in parallel relationship to one another, allowing one or both of the first and second reservoir valves 40, 42 to be closed at any given time. The size of the orifices of the reservoir valves 40, 42 may vary to provide different flow rates. While both first and second reservoir valves 40, 42 are disclosed, it should be understood that the manifold block 28 may only include a first reservoir valve 40, for example.

Because of the presence of the pair of reservoir valves 40, 42, three distinct flow rates of air being conveyed through the reservoir valves 40, 42 are possible: 1) maximum flow—when the first and second reservoir valves 40, 42 are open, 2) first reservoir valve 40 half flow—when the first reservoir valve 40 is opened and the other is closed, and 3) second reservoir valve 42 half flow—when the second reservoir valve 42 is opened and the other is closed. It should be appreciated that under certain operating conditions, it can be desirable to utilize different flow rates of air into the air springs 22, 24 to fill the air springs 22, 24 at faster or slower rates.

The dryer 52 reduces moisture in the air being conveyed through the base pneumatic line 68 to the manifold block 28 before it enters the reservoir and air springs 22, 24. Moisture is a common issue for such pressurized systems, as water vapor in the atmosphere can condense out inside the unit and create concerns for corrosion as well as freezing components in cold weather conditions. The dryer 52 may include a desiccant disposed therein for absorbing excess moisture in the system that is conveyed through the base pneumatic line 68, for example. The moisture content of the desiccant is increased as air passes through the dryer 52 away from the compressor 26, and the moisture content of the desiccant is decreased as air passes through the dryer 52 toward the compressor 26.

According to an aspect, the at least one pressure sensor 54, 81, 83 can be disposed in the manifold block 28 for measuring the pressure in the manifold block 28, reservoir tank 50, and/or air springs 22, 24; however, it should be appreciated that the pressure sensors 54, 81, 83 may be disposed elsewhere. In order to obtain individual readings of each of the air springs 22, 24 or the reservoir tank 50 when pressure sensor 54 is disposed in the manifold block 28, the manifold block 28 may be evacuated and then the valve for the device in question is momentarily opened (e.g., reservoir valves 40, 42 to measure the pressure in the reservoir tank 50). Nevertheless, it may not be necessary to exhaust the manifold block 28, when reading the pressure of the device in question (i.e., the manifold block 28 is not always exhausted when reading the pressure of the device in question).

A dryer control valve (not shown) can be provided in-line with the compressor inlet port 66. The dryer control valve can also be electrically connected to the central electronic control unit 56 for selectively opening and closing the dryer control valve. In most circumstances, the dryer control valve may be left open to permit air flow back and forth to and from the manifold block 28. However, when an individual pressure reading is required of either the reservoir tank 50 or of any combination of the air springs 22, 24, the dryer control valve can be closed along with the air springs 22, 24 or other air springs 22, 24 and reservoir tank 50, thus isolating the dryer 52 volume from the manifold block 28. Since the manifold block 28 consists largely of small drilled holes connecting the components together, with the dryer control valve closed, there is very little air volume exposed to the pressure sensor 54 as opposed to the volume of the manifold block 28, dryer 52 and base pneumatic line 68. This allows the pressure reading of a specific device to stabilize almost instantaneously and with very little air volume loss, thus making them much faster and more efficient. Accordingly, implementing the dryer control valve can improve the speed and efficiency of taking pressure readings.

Typical air management systems 20 require higher flows on exhaust due to the evaporative effect required from the dryer 52. To provide high flows on exhaust for a four wheel air suspension system, four suspension valves 36 are utilized—one per each corner of the vehicle. The four suspension valves 36 can be utilized to exhaust a single axle at any given time in order to lower the vehicle equally from front to rear. A single, fast or large orifice high flow exhaust valve 46 may be implemented in the control circuit by the addition of two simple isolation check valves 48. In more detail, a first high flow exhaust valve 46 is disposed in line with the plurality of suspension pneumatic lines 74 that extend to the plurality of rear air springs 24. Similarly, a second high flow exhaust valve 46 is disposed in line with the plurality of suspension pneumatic lines 74 that extend to the plurality of front air springs 22. A check valve 48 is disposed between each of the plurality of rear air springs 24 and the first high flow exhaust valve 46. Another check valve 48 is disposed between each of the plurality of front air springs 22 and the second high flow exhaust valve 46. These check valves 48 are configured in such a manner so as to allow flow though the high flow exhaust valve 46 when the vehicle is lowering but prevent flow to the forward direction when the air springs 22, 24 are filling. In other words, the high flow exhaust valve 46 and check valves 48 provide an additional flow path to improve trans-axle exhaust flow. It should be understood that the disclosure is not limited to the type, number, and configuration of the suspension valves 36 illustrated in the Figures and discussed herein and could instead utilize any design which isolates the manifold block 28 from the air springs 24.

Because of the presence of both the suspension valves 36 and high flow exhaust valves 46 and check valves 48, this configuration provides for two exhaust rates—1) allowing air to flow out of only the suspension valves 36, and 2) allowing air to flow out of both of the suspension valves 36 as well as the high flow exhaust valves 46 and check valves 48. Furthermore, the orifice size of the suspension valve 36, high flow exhaust valve 46 and/or check valves 48 may be changed to influence air flow. Accordingly, intake vs. exhaust rates may be tuned.

It should also be appreciated that this configuration provides for fast exhaust while maintaining integrity of the dryer 52. As such, this allows an increase in the vehicle lowering rate without harming the dryer 52. Furthermore, this configuration provides the intake and exhaust rates similar to that of a closed system where vehicle raising and lowering rates are about equal. Furthermore, this configuration provides improved exhaust flow while maintaining wheel-to-wheel isolation.

It is advantageous to assign one high flow exhaust valve 46 to each axle (e.g., a front axle associated with the plurality of front air springs 22 and a rear axle associated with the plurality of rear air springs 24), since in most instances the side-to-side pressure across an axle tend to be the same or nearly the same. Another reason to implement the high flow exhaust valve 46 across each axle is that in the lowering process it is often required to balance front and rear lowering rates independently. This configuration is thus completely suited to independent axle control. Furthermore, this configuration advantageously allows side to side corner pressure balance due to the axle check valve design and leak rate that results therefrom. A high leak rate will equalize pressure quickly, on the order of seconds to minutes, whereas a low leak rate may take several days. Additionally, the subject configuration allows concurrent lowering of the vehicle on both axles by modulating the high flow exhaust valve 46 on the higher pressure axle.

As illustrated in FIGS. 2 and 3, a method for operating the air management system 20 to control an air suspension assembly of an automotive vehicle is also provided. The method includes the step of 100 pressurizing air in a reservoir tank 50. The method continues by 102 providing the pressurized air from the reservoir tank 50 to an air inlet 58 of a compressor 26. More specifically, the step of 102 providing the pressurized air from the reservoir tank 50 to the air inlet 58 of a compressor 26 could include the step of 104 operating a boost valve 38 of the compressor 26 to provide the pressurized air from the reservoir tank 50 to the air inlet 58 of the compressor 26. It should be understood that while the disclosed air management system 20 utilizes a compressor 26 including the boost valve 38 (i.e., including a prime port or having a boost function), other compressors 26 with a similar prime port or other arrangements that allow pressurized air to be provided to the air inlet 58 of the compressor 26 would work as well.

The method also includes the step of 106 determining a pressure difference between a manifold block 28 and the air inlet 58 of the compressor 26 (i.e., pressure from the reservoir tank 50 through the boost valve 38). More specifically, such a step could include 108 determining a pressure difference between a manifold pressure in a manifold block 28 and a boost pressure in a boost valve 38 (i.e., pressure from the reservoir tank 50). As described above, the pressure sensor 54 in the manifold block 28 can be used for measuring the pressure in the manifold block 28, reservoir tank 50, and/or air springs 22, 24. However, as mentioned above, individual readings of each of the air springs 22, 24 or the reservoir tank 50 may require that the manifold block 28 be evacuated and then the valve for the device in question can be momentarily opened.

Because the evacuating or exhausting of the manifold block 28 is generally not desirable due to the noise, the air management system 20 can utilize additional sensors in addition to or instead of pressure sensor 54 for determining the pressure difference between the manifold block 28 and the boost valve 38. As discussed above, such additional sensors could include, but are not limited to sensors at the boost valve 38 (e.g., boost valve pressure sensor 83) or within the reservoir tank 50 (e.g., reservoir pressure sensor 81). However, it should be appreciated that even when pressure sensor 54 is the only pressure sensor in the air management system 20, it is not always necessary to exhaust the manifold block 28 when determining pressure of a device in question.

The method proceeds with the step of 110 retaining pressure in the manifold block 28 in response to the pressure difference being less than a predetermined amount. The pressure provided to the boost valve 38 of the compressor 26 allows for a reduction in startup torque of the motor 60 of the compressor 26 without exhausting the manifold block 28 (as long as the pressure difference between the manifold block 28 and the boost valve 38 is less than the predetermined amount). Therefore, the compressor 26 can be started without exhausting the manifold block 28 and without the risk that the compressor 26 could stall while starting. Because the manifold block 28 is not exhausted, the noise traditionally associated with exhausting the manifold block 28 prior to starting the compressor 26 can be eliminated. So, no noise is created due to the exhausting of the manifold block 28, unless the pressure difference between the manifold block 28 and the boost valve 38 is greater than the predetermined amount. Additionally, if the manifold block 28 is not exhausted, there is no associated air loss to the atmosphere. In other words, the air in the manifold block 28 is conserved. The amount of the air that can be lost due to exhausting the manifold block 28 can vary depending on the size of the manifold block 28 and could include the volume of dryer 52 (e.g., up to about 0.2 L), which could be significant over a period of time (e.g., repeatedly exhausting the manifold block 28).

While one of the objectives of the disclosed the air management system 20 is to avoid exhausting the manifold block 28, the manifold block 28 may still need to be exhausted under certain circumstances. These circumstances include, but are not limited to instances when the pressure difference is greater than the predetermined amount. In such a situation, the manifold block 28 could still be exhausted in an effort to reduce to the torque required to start the compressor 26. For instance, the reservoir tank 50 could be depleted or the boost valve 38 may not be functional (i.e., the boost function of the compressor 26 is offline). Thus, the method can also include the step of 112 exhausting the manifold block 28 in response to the pressure difference being greater than the predetermined amount.

The method then includes the step of 114 starting a motor 60 of the compressor 26. The method can also include the step of 116 verifying that the motor 60 of the compressor 26 has started. More specifically, the step of 116 verifying that the motor 60 of the compressor 26 has started can include the step of 118 monitoring the current supplied to the motor 60 of the compressor 26. The step 116 verifying that the motor 60 started can also include monitoring a pressure at the primary outlet 62 of the compressor 26 using the at least one pressure sensor 54, 81, 83 (e.g., within the manifold block 28).

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An air management system for controlling an air suspension assembly of an automotive vehicle comprising:
   a compressor for providing pressurized air;
   a reservoir tank coupled to said compressor for containing a volume of the pressurized air;
   a manifold block having a plurality of valves coupled with the air suspension assembly and coupled to said reservoir tank and said compressor for controlling air flow to the air suspension assembly;
   at least one pressure sensor coupled to said manifold block for determining a pressure in said air management system;
   a boost valve coupled to said reservoir tank for selectively directly connecting said reservoir tank and an inlet of said compressor;
   an electronic control unit coupled to said plurality of valves and said compressor and said at least one pressure sensor and said boost valve and configured to:
   provide the pressurized air from said reservoir tank to said inlet of said compressor using said boost valve,
   determine a pressure difference between said manifold block and said boost valve, and
   retain pressure in said manifold block in response to the pressure difference being less than a predetermined amount to provide for a reduction in startup torque of said compressor without exhausting said manifold block,
   wherein said at least one pressure sensor includes a boost valve pressure sensor disposed at said boost valve and said electronic control unit is further configured to determine a pressure at said boost valve using said boost valve pressure sensor.

2. The air management system as set forth in claim 1, wherein said electronic control unit is further configured to exhaust said manifold block in response to the pressure difference being greater than the predetermined amount.

3. The air management system as set forth in claim 1, wherein said electronic control unit is further configured to start a motor of said compressor.

4. The air management system as set forth in claim 3, wherein said electronic control unit is further configured to verify that said motor of said compressor has started.

5. The air management system as set forth in claim 3, wherein said electronic control unit is further configured to monitor a current supplied to said motor of said compressor.

6. The air management system as set forth in claim 1, wherein said at least one pressure sensor includes a reservoir pressure sensor disposed in said reservoir tank and said electronic control unit is further configured to determine a pressure in said reservoir tank using said reservoir pressure sensor.

7. The air management system as set forth in claim 1, wherein said manifold block includes plurality of suspension ports fluidly connected to said compressor and to a plurality of air springs of the air suspension assembly and said manifold block includes a reservoir port fluidly connected to said plurality of suspension ports and a first reservoir valve and a second reservoir valve each disposed in line with said reservoir port for selectively inhibiting and allowing air to be conveyed between said manifold block and said reservoir tank.

8. The air management system as set forth in claim 1, wherein said boost valve is disposed in said compressor.

9. A method of operating an air management system including a compressor and a manifold block coupled to an air suspension assembly and the compressor for reducing a startup torque of the compressor, comprising the steps of:
pressurizing air in a reservoir tank;
providing the pressurized air from the reservoir tank to an air inlet of the compressor;
determining a pressure difference between the manifold block and the air inlet of the compressor using at least one pressure sensor;
retaining pressure in the manifold block in response to the pressure difference being less than a predetermined amount; and
starting a motor of the compressor,
wherein the step of determining the pressure difference between the manifold block and the air inlet of the compressor includes determining a pressure difference between a manifold pressure in the manifold block and a boost pressure in a boost valve,
wherein the step of determining a pressure difference between a manifold pressure in the manifold block and a boost pressure in a boost valve includes determining the pressure at the boost valve using a boost valve pressure sensor disposed at the boost valve.

10. The method as set forth in claim 9, further including the step of exhausting the manifold block in response to the pressure difference being greater than the predetermined amount.

11. The method as set forth in claim 9, wherein the step of providing the pressurized air from the reservoir tank to the air inlet of the compressor includes operating a boost valve of the compressor to provide the pressurized air from the reservoir tank to the air inlet of the compressor.

12. The method as set forth in claim 9, wherein the step of determining a pressure difference between a manifold pressure in the manifold block and a boost pressure in a boost valve includes determining the pressure in the manifold block using the at least one pressure sensor disposed in the manifold block.

13. The method as set forth in claim 9, further including the step of reducing startup torque of a motor of the compressor in response to the retaining of pressure in the manifold block.

14. The method as set forth in claim 13, further including the step of eliminating noise associated with air being exhausted from the manifold block in response to the retaining of pressure in the manifold block.

15. The method as set forth in claim 13, further including the step of conserving air in the manifold block in response to the retaining of pressure in the manifold block.

16. The method as set forth in claim 9, further including the step of verifying that the motor of the compressor has started.

17. The method as set forth in claim 16, wherein the step of verifying that the motor of the compressor has started includes monitoring a current supplied to the motor of the compressor.

18. The method as set forth in claim 16, wherein the step of verifying that the motor of the compressor has started includes monitoring a pressure at a primary outlet of the compressor using the at least one pressure sensor.

19. A method of operating an air management system including a compressor and a manifold block coupled to an air suspension assembly and the compressor for reducing a startup torque of the compressor, comprising the steps of:
pressurizing air in a reservoir tank;
providing the pressurized air from the reservoir tank to an air inlet of the compressor;
determining a pressure difference between the manifold block and the air inlet of the compressor using at least one pressure sensor;
retaining pressure in the manifold block in response to the pressure difference being less than a predetermined amount; and
starting a motor of the compressor,
wherein the method further includes the step of verifying that the motor of the compressor has started, and
wherein the step of verifying that the motor of the compressor has started includes monitoring a pressure at a primary outlet of the compressor using the at least one pressure sensor.

* * * * *